United States Patent
Nakase et al.

(10) Patent No.: US 8,314,853 B2
(45) Date of Patent: Nov. 20, 2012

(54) IMAGE SEARCH APPARATUS, CONTROL METHOD, AND STORAGE MEDIUM

(75) Inventors: Yuichi Nakase, Tokyo (JP); Yohei Fujitani, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 183 days.

(21) Appl. No.: 12/980,933

(22) Filed: Dec. 29, 2010

(65) Prior Publication Data

US 2011/0194010 A1    Aug. 11, 2011

(30) Foreign Application Priority Data

Feb. 5, 2010 (JP) ................................. 2010-024830

(51) Int. Cl.
*H04N 5/76* (2006.01)
*H04N 5/222* (2006.01)

(52) U.S. Cl. ............... 348/231.2; 348/231.3; 348/231.6; 348/333.02; 348/333.05

(58) Field of Classification Search ............... 348/231.2, 348/231.3
See application file for complete search history.

(56) References Cited

U.S. PATENT DOCUMENTS

| | | | | |
|---|---|---|---|---|
| 5,608,858 A * | 3/1997 | Kurosu et al. | ................. | 715/209 |
| 6,178,465 B1 * | 1/2001 | Shirai et al. | ....................... | 710/1 |
| 7,142,325 B2 * | 11/2006 | Nagata | ......................... | 358/1.18 |
| 2002/0001468 A1 * | 1/2002 | Kaku | ............................ | 396/310 |
| 2009/0175615 A1 * | 7/2009 | Kobayashi et al. | ............ | 396/310 |
| 2010/0002096 A1 * | 1/2010 | Hong | .......................... | 348/231.3 |
| 2010/0157096 A1 * | 6/2010 | Park et al. | .................. | 348/231.3 |

FOREIGN PATENT DOCUMENTS

JP        07-271801        10/1995

* cited by examiner

*Primary Examiner* — Ngoc-Yen Vu
(74) *Attorney, Agent, or Firm* — Cowen, Liebowitz & Latman, P.C.

(57) ABSTRACT

The present invention provides an image search apparatus including a control unit configured to, when a search key image is set, perform an obtaining process of obtaining at least either of feature amounts of the search key image, a generation process of generating a plurality of search conditions different from each other from the at least either of the feature amounts and the image capturing conditions, a search process of searching the plurality of images except the search key image for an image matching or similar to the search condition for each of the plurality of search conditions, the display control process of displaying a plurality of images that are images found for the plurality of search conditions, a selection process of selecting one image from the plurality of images, and a setting process of setting, as a new search key image, the image selected.

19 Claims, 9 Drawing Sheets

FIG. 4

| | | |
|---|---|---|
| 400 | | |
| | SOI | 410 |
| APP1 | APP1 | 420 |
| | APP1 Length | 421 |
| | APP1 Identifier Code : Exif | 422 |
| | DateTime | 423 |
| | DateTimeOriginal | 424 |
| | ColorInfo | 425 |
| | FaceInfo | 426 |
| | ...Etc. | 427 |
| | Thumbnail Data | 428 |
| APP1 | APP1 | 430 |
| | APP1 Length | 431 |
| | APP1 Identifier Code : XMP | 432 |
| | Rating | 433 |
| | MetaDataDate | 434 |
| | ...Etc. | 435 |
| | DQT | 440 |
| | DHT | 450 |
| | SOF | 460 |
| | SOS | 470 |
| | Compressed data | 480 |
| | EOI | 490 |

IMAGE SEARCH APPARATUS, CONTROL METHOD, AND STORAGE MEDIUM

BACKGROUND OF THE INVENTION

1. Field of the Invention

The present invention relates to an image search apparatus, control method, and storage medium.

2. Description of the Related Art

With the advance of recording media, an image capturing apparatus such as a digital camera can record an enormous number of images, and there is a need for a technique to efficiently search for and browsing such enormous numbers of images. In addition to techniques for displaying many thumbnail images and techniques for displaying images matching or similar to input search conditions when searching for and browsing an enormous number of images, Japanese Patent Laid-Open No. 7-271801 proposes a technique of searching for and displaying images based on search conditions generated from information added to the images.

However, the technique of displaying many thumbnail images cannot search for a specific image, though it allows quick browsing of an enormous number of images. The technique of displaying images matching or similar to input search conditions requires a cumbersome operation of, for example, inputting search conditions for each image search. The technique disclosed in Japanese Patent Laid-Open No. 7-271801 requires input of a keyword or the like for the first image search. In addition, continuing an image search based on search conditions (that is, repetitively performing a search) is not taken into consideration at all. As described above, the conventional techniques do not allow for efficient image search and place a heavy operation load on the user; they suffer greatly from a lack of operability (usability).

SUMMARY OF THE INVENTION

The present invention provides a technique advantageous in improving image search efficiency and operability (usability).

According to one aspect of the present invention, there is provided an image search apparatus for searching for an image, including an obtaining unit configured to perform an obtaining process of obtaining, from a search key image set out of a plurality of images to generate a search condition, at least either of feature amounts of the search key image and image capturing conditions of the search key image, a generation unit configured to perform a generation process of generating a plurality of search conditions different from each other from the at least either of the feature amounts and the image capturing conditions obtained by the obtaining unit, a search unit configured to perform a search process of searching the plurality of images except the search key image for an image matching or similar to the search condition for each of the plurality of search conditions generated by the generation unit, a display control unit configured to perform a display control process of controlling a display unit to display a plurality of images that are images found for the plurality of search conditions by the search unit, a selection unit configured to perform a selection process of selecting, in accordance with a user operation, one image from the plurality of images displayed on the display unit by the display control unit, a setting unit configured to perform a setting process of setting, as a new search key image, the image selected by the selection unit, and a control unit configured to, when the setting unit sets the new search key image, control the obtaining unit, the generation unit, the search unit, the display control unit, the selection unit, and the setting unit to perform the obtaining process, the generation process, the search process, the display control process, the selection process, and the setting process using the new search key image.

Further aspects of the present invention will become apparent from the following description of exemplary embodiments with reference to the attached drawings.

BRIEF DESCRIPTION OF THE DRAWINGS

FIG. 4 is a view showing an example of the structure of an image file (still image file) recorded in a recording medium.

DESCRIPTION OF THE EMBODIMENTS

Figure 1:
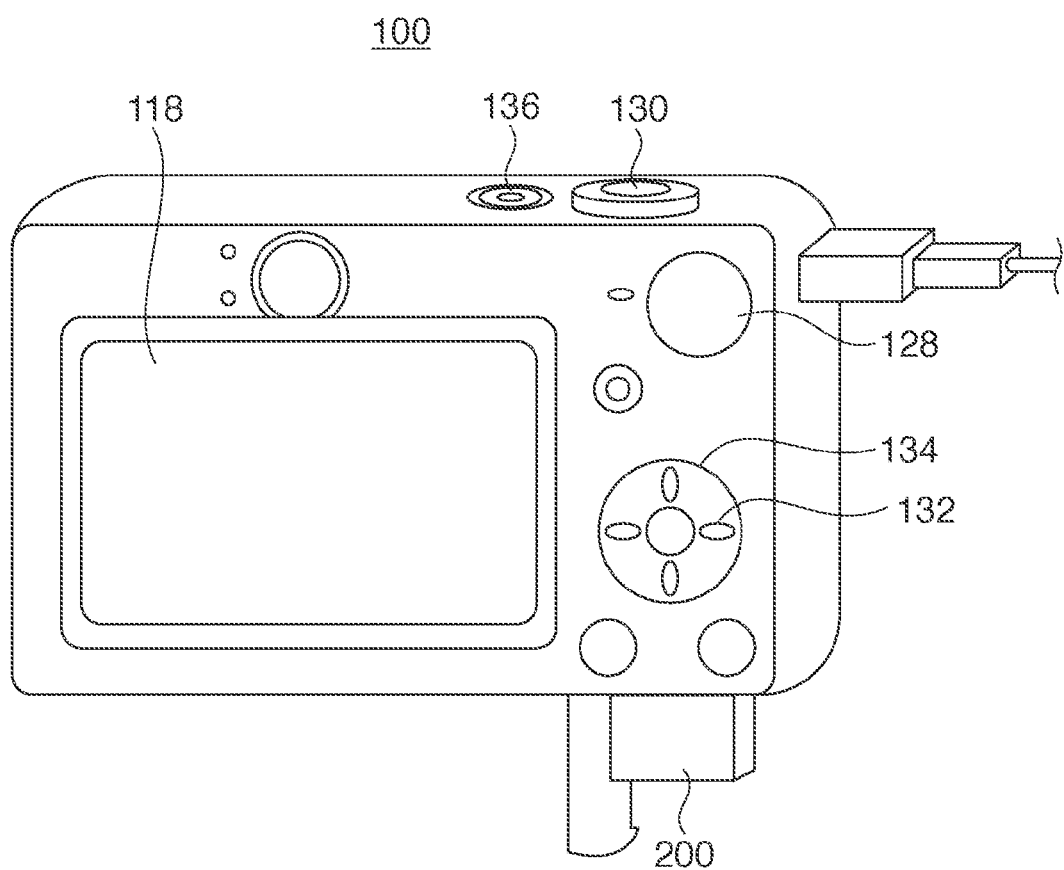
FIG. 1 is a schematic view showing the outer appearance of an image capturing apparatus which functions as an image search apparatus according to an embodiment of the present invention.

Preferred embodiments of the present invention will be described below with reference to the accompanying drawings. Note that the same reference numerals denote the same members throughout the drawings, and a repetitive description thereof will not be given.

Figure 2:
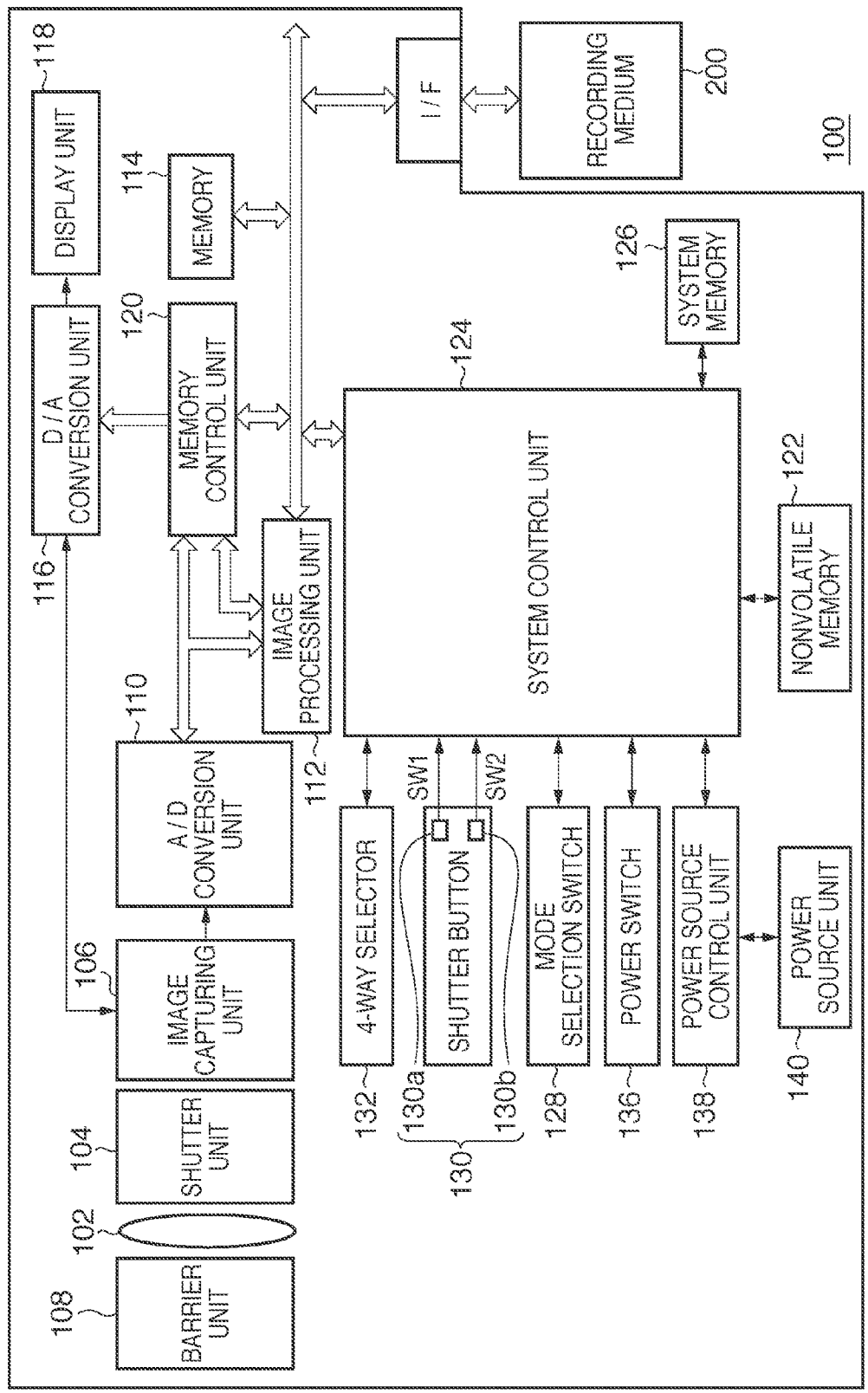
FIG. 2 is a schematic block diagram showing the arrangement of the image capturing apparatus shown in FIG. 1.

FIG. 1 is a schematic view showing the outer appearance of an image capturing apparatus 100 which functions as an image search apparatus according to an embodiment of the present invention. FIG. 2 is a schematic block diagram showing the arrangement of the image capturing apparatus 100. The image capturing apparatus 100 is an image capturing apparatus for capturing an object, and is implemented as a digital camera in this embodiment. The image capturing apparatus 100 records image data (image file) corresponding to a captured image in a recording medium 200 connected to the image capturing apparatus 100, and also displays (reproduces) an image corresponding to image data (image file) recorded in the recording medium 200. Note that the recording medium 200 is formed from a memory card or a hard disk to record various kinds of data. When accommodated in a slot of the image capturing apparatus 100, the recording medium 200 can communicate with the image capturing apparatus 100 via an interface (I/F).

As shown in FIGS. 1 and 2, the image capturing apparatus 100 includes an imaging optical system 102, shutter unit 104, image capturing unit 106, barrier unit 108, A/D conversion unit 110, image processing unit 112, memory 114, D/A conversion unit 116, and display unit 118. The image capturing apparatus 100 also includes a memory control unit 120, nonvolatile memory 122, system control unit 124, and system memory 126. The image capturing apparatus 100 also includes a mode selection switch 128, shutter button 130, 4-way selector 132, wheel 134, power switch 136, power source control unit 138, and power source unit 140.

The imaging optical system 102 includes an imaging lens and a focus lens, and forms an image of light from an object (that is, forms an optical image) on the imaging plane of the image capturing unit 106. In this embodiment, the shutter unit 104 has a stop function. The image capturing unit 106 is formed from, for example, a CCD or CMOS device (photoelectric conversion device), and converts the optical image formed by the imaging optical system 102 into an electrical signal. The barrier unit 108 covers the image capturing system including the imaging optical system 102, shutter unit 104, and image capturing unit 106 to prevent the image capturing system from getting dirt or damaged. The A/D conversion unit 110 has a function of converting an analog signal into a digital signal, and in this embodiment, converts the analog signal output from the image capturing unit 106 into a digital signal.

The image processing unit 112 performs a resize process such as pixel interpolation or reduction or a color conversion process for data input from the A/D conversion unit 110 or data input from the memory control unit 120. The image processing unit 112 also performs a predetermined calculation process using a captured image and outputs the calculation result to the system control unit 124. The system control unit 124 controls exposure and focus detection based on the calculation result from the image processing unit 112. An AF (Auto Focus) process, AE (Auto Exposure) process, and EF (flash pre-emission) process of TTL (Through The Lens) scheme are thus executed. The image processing unit 112 also performs a predetermined calculation process using a captured image and executes an AWB (Automatic White Balance) process of TTL scheme based on the calculation result.

The memory 114 stores data output from the A/D conversion unit 110 via the image processing unit 112 and the memory control unit 120 or via the memory control unit 120. For example, the memory 114 stores image data (still image data or moving image data) output from the image capturing unit 106 and converted into a digital signal by the A/D conversion unit 110, or image data to be displayed on the display unit 118 (that is, for image display). Hence, the memory 114 has a storage capacity capable of storing a predetermined number of still image data or moving image data and audio data in a predetermined time. Note that the memory 114 also functions as a memory (video memory) for image display.

The D/A conversion unit 116 converts image data for image display stored in the memory 114 into an analog signal and supplies it to the display unit 118. The display unit 118 includes a display device such as an LCD and displays an image corresponding to an analog signal supplied from the D/A conversion unit 116 or various kinds of information concerning the image capturing apparatus 100.

The memory control unit 120 controls data (for example, image data) to be stored in the memory 114 or data read out from the memory 114. The nonvolatile memory 122 is a memory capable of electrically erasing and recording data and includes, for example, an EEPROM. The nonvolatile memory 122 stores (records) constants and programs (programs to be used to execute various flowcharts to be described later) for the operation of the system control unit 124.

The system control unit 124 controls the entire image capturing apparatus 100. The system control unit 124 executes the programs stored in the nonvolatile memory 122 to implement each process of the embodiment. For example, the system control unit 124 controls a display by controlling the memory 114, D/A conversion unit 116, display unit 118, and the like. The system memory 126 is formed from, for example, a RAM and expands the constants and variables for the operation of the system control unit 124 and programs read out from the nonvolatile memory 122.

The plurality of switches and buttons including the mode selection switch 128, shutter button 130, 4-way selector 132, wheel 134, and power switch 136 function as an operation unit which accepts user operations (inputs various kinds of operation instructions to the system control unit 124). The operation unit also includes a touch panel provided on the display unit 118. Functions are assigned to the touch panel as needed by selecting (operating) various function icons displayed on the display unit 118. In other words, the touch panel functions as function buttons such as an end button, return button, image feed button, jump button, narrowing button, attribute change button, and related image reproduction button. For example, when the user presses a menu button, the display unit 118 displays a menu screen that enables various kinds of settings. The user can intuitively do various kinds of settings using the menu screen displayed on the display unit 118, the 4-way selector 132 including up, down, left, and right buttons arranged in a cross, and a set button.

The mode selection switch 128 is used to switch the operation mode of the image capturing apparatus 100 (system control unit 124). In this embodiment, the operation mode of the image capturing apparatus 100 can be switched to, for example, a still image capturing mode, moving image capturing mode, or reproduction mode.

The shutter button 130 is used to instruct to capture an object and includes a first shutter switch 130a and a second shutter switch 130b. When the shutter button 130 is operated (pressed) halfway, the first shutter switch 130a is turned on to generate a first shutter switch signal SW1 and supply it to the system control unit 124. Note that the system control unit 124 starts an AF process, AE process, EF process, and the like based on the first shutter switch signal SW1 supplied from the first shutter switch 130a. When the shutter button 130 is operated (pressed) fully, the second shutter switch 130b is turned on to generate a second shutter switch signal SW2 and supply it to the system control unit 124. Note that the system control unit 124 starts a series of image capturing processes from image readout from the image capturing unit 106 up to image data recording in the recording medium 200 based on the second shutter switch signal SW2 supplied from the second shutter switch 130b.

The wheel 134 is a rotatable member which is used together with the 4-way selector 132 to, for example, designate an option displayed on the display unit 118. The wheel 134 generates an electrical pulse signal in accordance with the rotation amount and supplies it to the system control unit 124. Based on the pulse signal supplied from the wheel 134, the system control unit 124 controls each unit of the image capturing apparatus 100. Note that the wheel 134 can be a member of any type capable of detecting the user's rotating operation. For example, the wheel 134 can be a dial member which rotates by itself to generate a pulse signal in accordance with the user's rotating operation or a touch wheel which detects the user's rotating operation on it without rotating.

The power switch 136 is used to switch the power state of the image capturing apparatus 100 between an ON state and an OFF state. The power source control unit 138 includes a battery detection circuit, DC/DC converter, and switching circuit for switching a block to be energized, and detects the presence/absence of a battery attached to the power source unit 140, the type of battery, and the battery level. Additionally, the power source control unit 138 controls the DC/DC converter based on the detection result in the power source unit 140 and an instruction from the system control unit 124 so as to supply a necessary voltage to the units of the image capturing apparatus 100 including the recording medium 200 during a necessary period. The power source unit 140 detachably holds a primary cell such as an alkaline cell or a lithium cell, a secondary cell such as an NiCd cell, NiMH cell, or Li cell, or an AC adapter, and outputs a voltage (DC voltage).

The image capturing apparatus 100 can capture an object using one-point AF or face AF. One-point AF means performing AF on one point corresponding to the central position of the imaging screen. Face AF means performing AF on a face in the imaging screen detected by a face detection process. The image capturing apparatus 100 can also perform face AE, face FE, and face WB simultaneously with face AF. Face AE means optimizing exposure in the whole imaging screen in accordance with the brightness of a face detected by a face detection process. Face FE means controlling the brightness of the electronic flash concentrating on a face detected by a face detection process. Face WB means optimizing WB in the whole imaging screen in accordance with the color of a face detected by a face detection process.

The face detection process will briefly be described. In the face detection process, first, the system control unit 124 inputs image data of the face detection target to the image processing unit 112. The image processing unit 112 applies a horizontal bandpass filter and a vertical bandpass filter to the received image data to detect edge components from the image data under the control of the system control unit 124. The system control unit 124 performs pattern matching for the edge components extracted by the image processing unit 112 to extract eye, nose, mouth, and ear candidates. The system control unit 124 determines some of the extracted candidates satisfying preset conditions (for example, the distance and tilt between two eyes) as eyes and narrows down them to eye candidates. The system control unit 124 associates the narrowed eye candidates with other corresponding face patterns (nose, mouth and ears) and applies a preset non-face condition filter, thereby detecting faces. The system control unit 124 generates face information based on the face detection result and ends the face detection process. Note that the face information includes, for example, the number of faces and their positions and sizes, and is stored in the memory 114 or the recording medium 200 as the feature amounts of the image (image data) in association with the image data.

As described above, the image capturing apparatus 100 can analyze image data corresponding to an image to be displayed in live view or reproduced (displayed) and detect the feature amounts of the image data such as face information.

Figure 3:
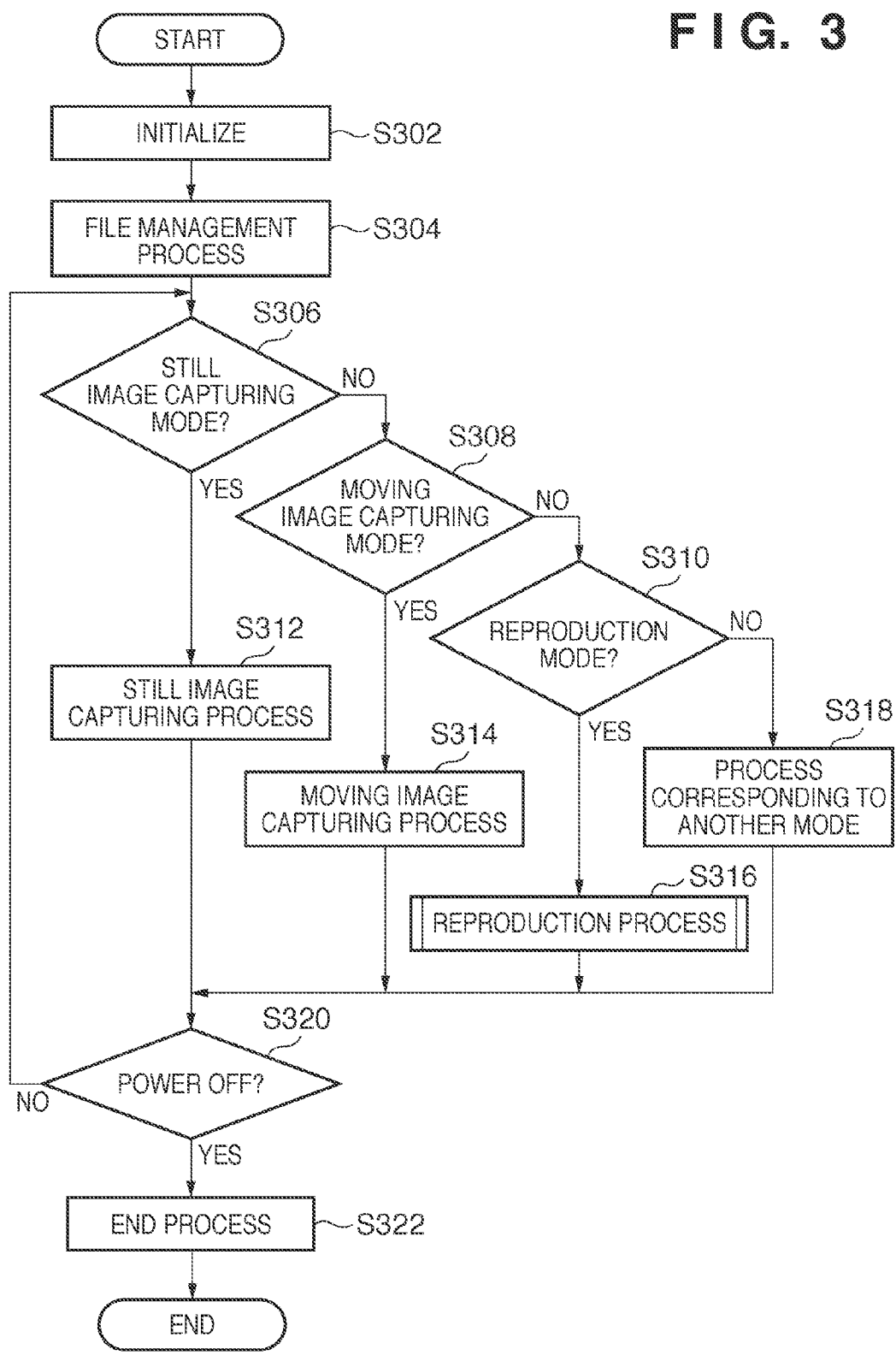
FIG. 3 is a flowchart for explaining the operation of the image capturing apparatus shown in FIG. 1.

The overall operation of the image capturing apparatus 100 will be described below. FIG. 3 is a flowchart for explaining the operation of the image capturing apparatus 100. When the user operates the power switch 136 to change the power state of the image capturing apparatus 100 from the OFF state to the ON state, the image capturing apparatus 100 starts operating.

In step S302, the system control unit 124 initializes flags and control variables. In step S304, the system control unit 124 performs a management process (file management process) concerning files recorded in the recording medium 200. In this embodiment, the system control unit 124 obtains pieces of information regarding the presence/absence of a reproduction target directory, the presence/absence of reproduction target image data (image file), the path name list of the reproduction target image data, and the total number of images recorded in the recording medium 200, and stores them in the system memory 126.

In steps S306, S308, and S310, the system control unit 124 determines the operation mode of the image capturing apparatus 100 (that is, the operation mode set by the mode selection switch 128). More specifically, in step S306, the system control unit 124 determines whether the operation mode of the image capturing apparatus 100 is the still image capturing mode. Upon determining that the operation mode of the image capturing apparatus 100 is the still image capturing mode, the process advances to step S312, and the system control unit 124 performs a still image capturing process. Upon determining that the operation mode of the image capturing apparatus 100 is not the still image capturing mode, the process advances to step S308, and the system control unit 124 determines whether the operation mode of the image capturing apparatus 100 is the moving image capturing mode. Upon determining that the operation mode of the image capturing apparatus 100 is the moving image capturing mode, the process advances to step S314, and the system control unit 124 performs a moving image capturing process. Upon determining that the operation mode of the image capturing apparatus 100 is not the moving image capturing mode, the process advances to step S310, and the system control unit 124 determines whether the operation mode of the image capturing apparatus 100 is the reproduction mode. Upon determining that the operation mode of the image capturing apparatus 100 is the reproduction mode, the process advances to step S316, and the system control unit 124 performs a reproduction process. Note that the reproduction process in step S316 will be described later in detail. Upon determining that the operation mode of the image capturing apparatus 100 is not the reproduction mode (that is, a mode other than the still image capturing mode, moving image capturing mode, and reproduction mode), the process advances to step S318, and the system control unit 124 performs a process corresponding to the other mode. Examples of the other mode are a sending mode for sending a file recorded in the recording medium 200 and a reception mode for receiving a file from an external device and recording it in the recording medium 200. After the process corresponding to the operation mode set by the mode selection switch 128 (process in step S312, S314, S316, or S318) has been done, the process advances to step S320.

In step S320, the system control unit 124 determines whether the power state of the image capturing apparatus 100 has changed from the ON state to the OFF state in accordance with the operation of the power switch 136. If it is determined that the power state of the image capturing apparatus 100 is not the OFF state (the ON state is maintained), the process returns to step S306 (determination of the operation mode of the image capturing apparatus 100 in steps S306 to S310). If it is determined that the power state of the image capturing apparatus 100 is the OFF state, the process advances to step S322, and the system control unit 124 performs an end process. The end process includes, for example, a process of ending display of the display unit 118, a process of causing the barrier unit 108 to protect the image capturing system, a process of recording parameters and set values including the flags and control variables in the nonvolatile memory 122, and a process of stopping power supply to constituent elements that need no power supply. When the end process in step S322 is completed, the image capturing apparatus 100 ends the operation.

The structure of an image file (still image file) recorded in the recording medium 200 by the still image capturing process in step S312 will be described with reference to FIG. 4. As shown in FIG. 4, an image file 400 has, at its top, a marker (SOI) 410 indicating the start of the image file. The image file 400 also has a first application marker (APP1) 420 and a second application marker (APP1) 430 which correspond to the header following the marker 410. The image file 400 also has a marker (EOI) 490 indicating the end of the image file.

The first application marker 420 includes a size (APP1 Length) 421 and an identification code (APP1 Identifier Code) 422 representing that the application marker is Exif. The first application marker 420 also includes a creation date/time (Date Time) 423 of the image data and a date/time (Date Time Original) 424 the image data has been generated. The first application marker 420 further includes color information (ColorInfo) 425 of the image data, face information (FaceInfo) 426 of the image data, other image capturing information ( . . . Etc.) 427, and a thumbnail image (Thumbnail Data) 428.

The second application marker 430 includes a size (APP1 Length) 431 and an identification code (APP1 Identifier Code) 432 representing that the application marker is XMP. The second application marker 430 also includes rating 433, metadata change date/time (MetaDataDate) 434, and other image capturing information ( . . . Etc.) 435.

The image data recorded in the image file 400 includes a quantization table (DQT) 440, Huffman table (DHT) 450, and frame start marker (SOF) 460. The image file recorded in the image file 400 also includes a scan start marker (SOS) 470 and compressed data (Compressed data) 480.

Figure 5:
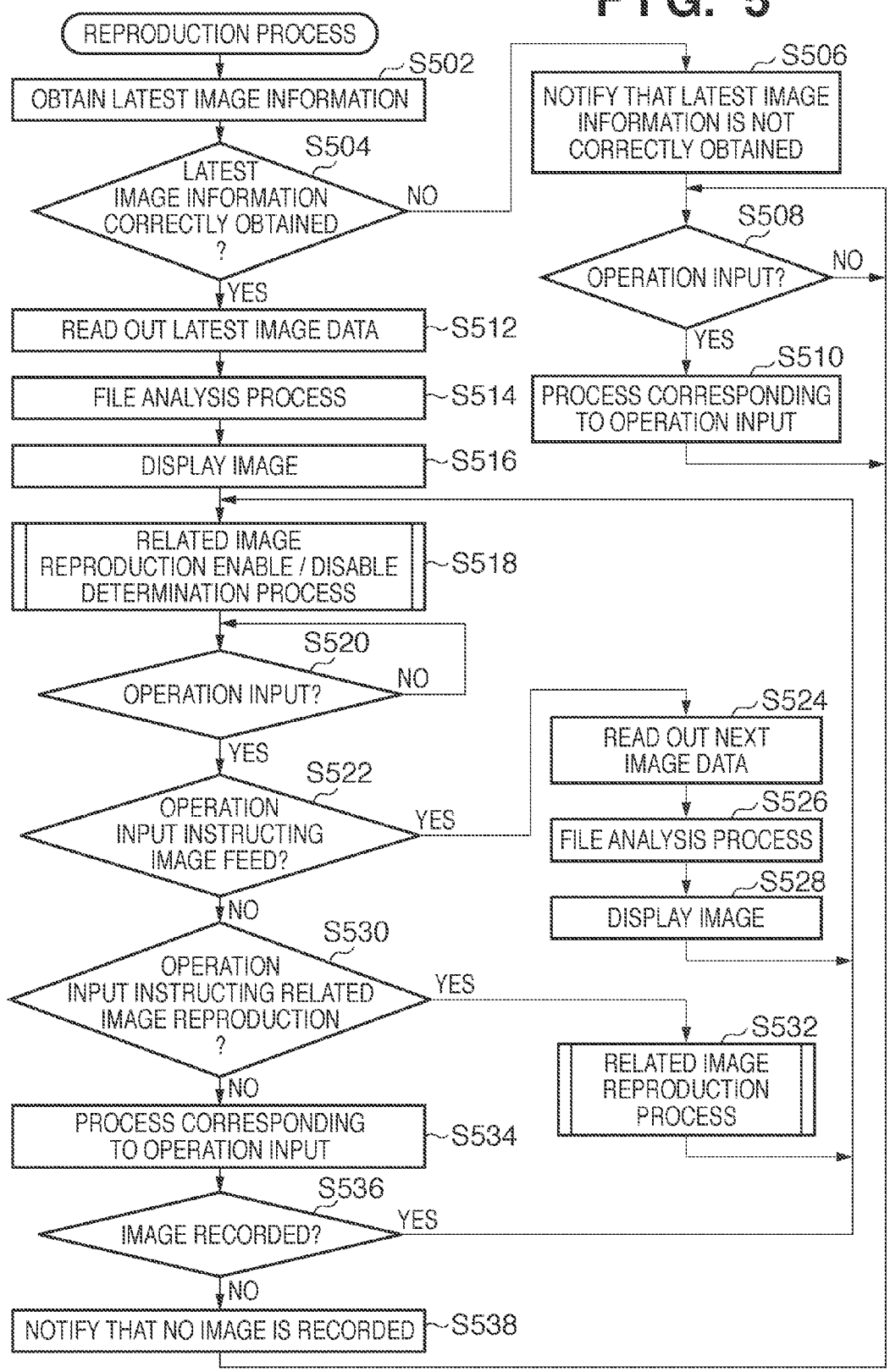
FIG. 5 is a flowchart for explaining a reproduction process in step S316 of FIG. 3 in detail.

The reproduction process in step S316 of FIG. 3 will be described. FIG. 5 is a flowchart for explaining the reproduction process in step S316 in detail. Note that the reproduction process is ended by an interrupt process or the like when the user operates the mode selection switch 128 to switch to another mode or when the user operates the power switch 136 to change the power state of the image capturing apparatus 100 to the OFF state.

In step S502, the system control unit 124 obtains, from the recording medium 200, latest image information of images (image data) recorded in it. In step S504, the system control unit 124 determines whether the latest image information has been obtained correctly from the recording medium 200. Upon determining that the latest image information has not been obtained correctly, the system control unit 124 waits for input from step S506 because of the absence of images. Note that the state wherein the latest image information cannot be obtained correctly possibly includes a state wherein no images are recorded in the recording medium 200 at all and a state wherein no image information can be obtained because of a failure in the recording medium 200. On the other hand, if it is determined that the latest image information has been obtained correctly, the process advances to step S512. Note that when the recording medium 200 records at least one image, image information can be obtained.

In step S506, the system control unit 124 notifies the user that the latest image information is not obtained correctly (no images are recorded in the recording medium 200). For example, the system control unit 124 displays a message "No image exists" on the display unit 118. In step S508, the system control unit 124 determines whether an operation input is received. Note that the operation input includes a user operation on the operation unit and an event for notifying the user of voltage drop of the power source unit 140. If it is determined that no operation input is received, step S508 is repeated until an operation input is received. Upon determining that an operation input is received, the process advances to step S510, and the system control unit 124 performs a process corresponding to the operation input. For example, even if no images are recorded in the recording medium 200, an operation input on the menu button causes the display unit 118 to display the menu screen and allows the user to change settings.

In step S512, the system control unit 124 reads out latest image data from the recording medium 200 based on the latest image information obtained in step S502. In step S514, the system control unit 124 performs a file analysis process to obtain the image feature amounts and the image capturing conditions of the latest image data read out in step S512.

In step S516, the system control unit 124 displays, on the display unit 118, the image corresponding to the latest image data read out in step S512. At this time, the display unit 118 may display the image feature amounts and the image capturing conditions obtained by the file analysis process in step S514. If an image data error such as partial corruption of the image data is detected by the file analysis process in step S514, the display unit displays it (error).

In step S518, the system control unit 124 performs a related image reproduction enable/disable determination process. Related image reproduction is a reproduction mode which, when browsing an enormous number of images, reproduces (displays) them not in a specific order like conventional image feed but in accordance with the user's interest. In related image reproduction, images matching or similar to a plurality of different search conditions generated from a currently reproduced image (search key image) are displayed together with the search key image. For example, an image including persons equal in number to persons included in the search key image, an image whose color tone is similar to that of the search key image, or an image generated on the same day as that of the search key image is searched for and displayed together with the search key image. One of the found images is selected in accordance with the user operation and set as a new search key image. An image search and display are executed using the new search key image. That is, related image reproduction can reproduce an enormous number of images not completely at random but in accordance with the user's interest, that is, (search conditions generated from) an image selected by the user. Note that the related image reproduction enable/disable determination process in step S518 will be described later with reference to FIG. 6.

In step S520, the system control unit 124 determines whether an operation input is received. Note that the operation input includes a user operation on the operation unit and an event for notifying the user of voltage drop of the power source unit 140. If it is determined that no operation input is received, step S520 is repeated until an operation input is received. Upon determining that an operation input is received, the process advances to step S522.

In step S522, the system control unit 124 determines whether the operation input instructs image feed. The operation input that instructs image feed is, for example, user's press (selection) of the image feed button via the operation unit. If it is determined that the operation input instructs image feed, the process advances to step S524. Upon determining that the operation input does not instruct image feed, the process advances to step S530.

In step S524, the system control unit 124 reads out next image data to be displayed on the display unit 118. The image feed button is formed from a pair of buttons (for example, the left and right buttons of the 4-way selector 132) corresponding to feed directions. Next image data is read out in accordance with the feed direction corresponding to the operated button. In step S526, the system control unit 124 performs a file analysis process to obtain the image feature amounts and the image capturing conditions of the next image data read out in step S524. In step S528, the system control unit 124 displays, on the display unit 118, the image corresponding to the next image data read out in step S524, and the process returns to step S518. At this time, the display unit 118 may display the image feature amounts and the image capturing conditions obtained by the file analysis process in step S526. If an image data error such as partial corruption of the image data is detected by the file analysis process in step S526, the display unit displays it (error).

In step S530, the system control unit 124 determines whether the operation input instructs related image reproduction. The operation input that instructs related image reproduction is, for example, user's press (selection) of the related image reproduction button via the operation unit. If it is determined that the operation input instructs related image reproduction, the process advances to step S532, and the system control unit 124 performs a related image reproduction process. The related image reproduction process will be described later with reference to FIG. 8. Upon determining that the operation input does not instruct related image reproduction, the process advances to step S534.

In step S534, the system control unit 124 performs a process corresponding to the operation input. Note that examples of a process corresponding to the operation input are an image (image data) erase process, image edit process, switching process to multi reproduction (multi image display), and menu screen display process by the menu button. Note that multi reproduction is a reproduction mode which arranges and displays a plurality of thumbnail images corresponding to image data on the display unit 118.

In step S536, the system control unit 124 determines whether an image is recorded in the recording medium 200. Upon determining that no image is recorded in the recording medium 200 (that is, no image is present because of an image erase process or the like in step S534), the process advances to step S538 to notify the user that no image is recorded in the recording medium 200. On the other hand, upon determining that an image is recorded in the recording medium 200, the process advances to step S518.

Figure 6:
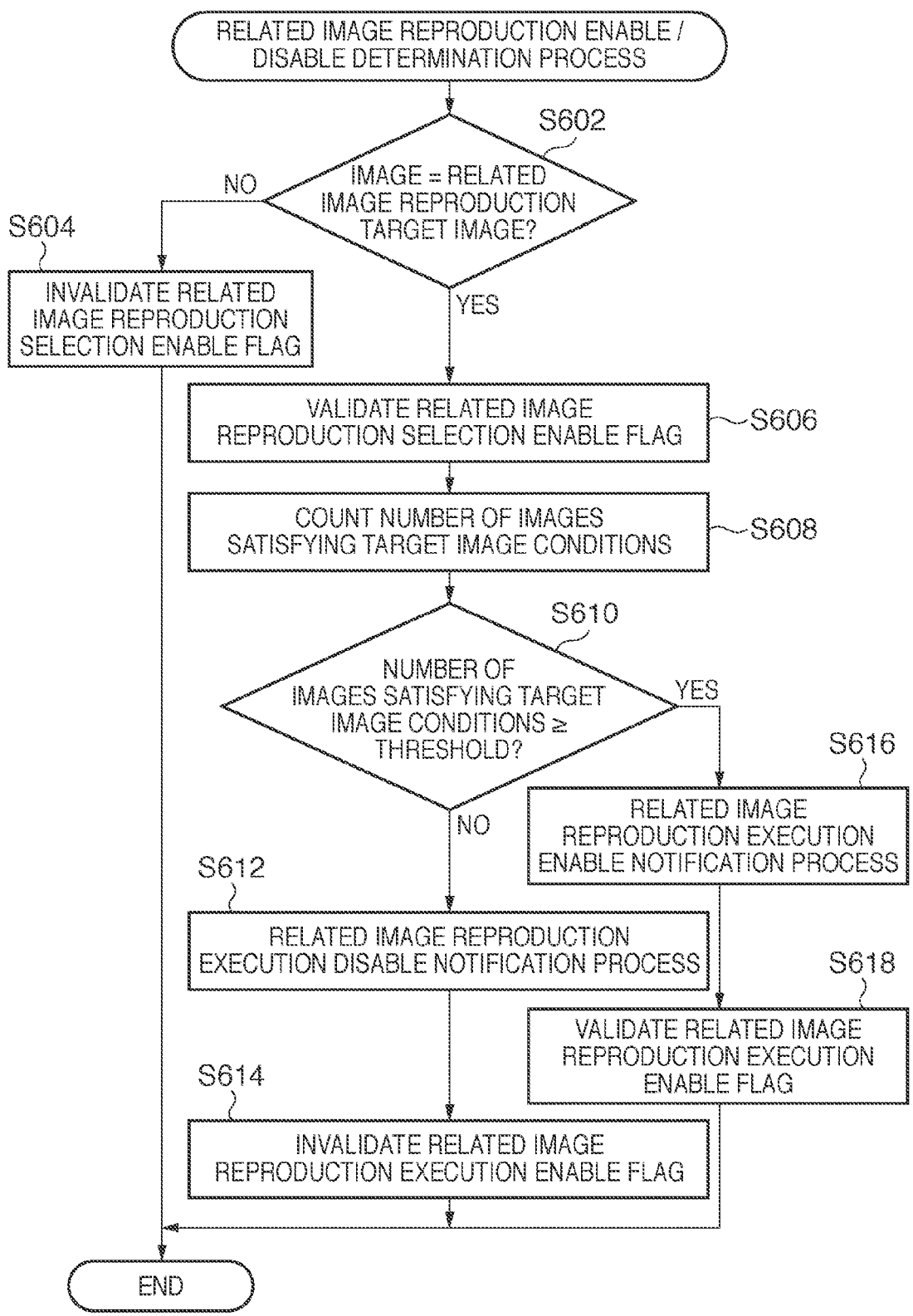
FIG. 6 is a flowchart for explaining a related image reproduction enable/disable determination process in step S518 of FIG. 5 in detail.

The related image reproduction enable/disable determination process in step S518 of FIG. 5 will be described. FIG. 6 is a flowchart for explaining the related image reproduction enable/disable determination process in step S518 in detail.

In step S602, the system control unit 124 determines whether the image (image data) displayed in step S516 is the related image reproduction target image. In this embodiment, a moving image or an image having image feature amounts and image capturing conditions necessary for generating search conditions is excluded from the related image reproduction target images. In other words, it is determined in step S602 whether the image displayed in step S516 satisfies conditions (target image conditions) that the image is not a moving image and has at least either of image feature amounts and image capturing conditions. Note that the target image conditions may be conditions that the image is a still image and has at least either of image feature amounts and image capturing conditions. The target image conditions may include a condition that out of the image capturing conditions of the image displayed in step S516, the model information of the image capturing apparatus that has captured the image represents a model capable of adding image feature amounts and image capturing conditions necessary for generating search conditions.

If it is determined that the image is not the related image reproduction target image, the system control unit 124 invalidates a related image reproduction selection enable flag stored in the memory 114 in step S604, and ends the related image reproduction enable/disable determination process.

Figure 7A:
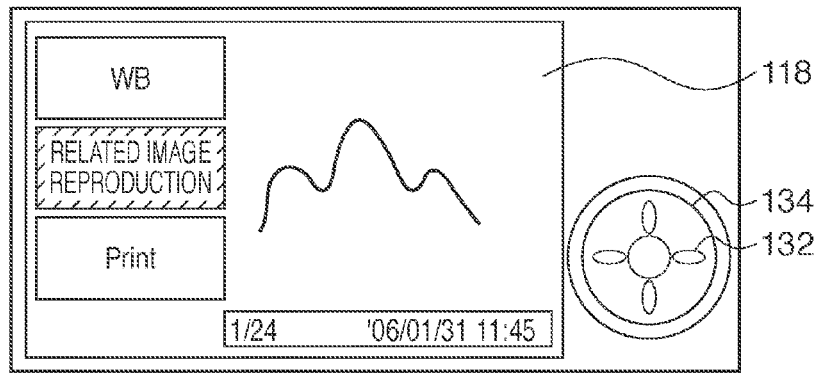
FIGS. 7A to 7D are views showing examples of display on the display unit of the image capturing apparatus shown in FIG. 1.

Note that if the related image reproduction selection enable flag is invalid, it is impossible to operate (select) the related image reproduction button, as shown in FIG. 7A. FIG. 7A illustrates a display example when the related image reproduction selection enable flag is invalid. The form (for example, color) of the related image reproduction button is made different from that of the other buttons (for example, WB button and Print button), thereby indicating that the related image reproduction button is inoperable. Upon determining that the image is the related image reproduction target image, the process advances to step S606.

In step S606, the system control unit 124 validates the related image reproduction selection enable flag stored in the memory 114. In step S608, the system control unit 124 counts the number of images satisfying the target image conditions out of the images recorded in the recording medium 200. Note that for a set of images temporally consecutively captured in the continuous shooting mode or the like, one representative image is counted. This is because when each of consecutively captured images is counted as a related image reproduction target image, related image reproduction is determined as executable (that is, steps S616 and S618 are performed) even when the recording medium 200 records only the consecutively captured images. Consecutively captured images often have the same or similar image feature amounts or image capturing conditions. If consecutively captured images are separately counted as related image reproduction targets, only images captured in the same continuously shooting operation are undesirably reproduced at high probability. An image which has undergone an image edit process in step S534 is similar to the image before the edit process at high possibility. For this reason, the images before and after the edit process are regarded as one image (that is, regarded as a series of images) and counted as one. However, when the image feature amounts are changed by the edit process, the images before and after the edit process may be counted as different images. A blurred image, defocused image, or image whose rating is −1 (removal) may be regarded as an image that need not be displayed in related image reproduction, and excluded from the related image reproduction target images.

In step S610, the system control unit 124 determines whether the number of images counted in step S608 as images satisfying the target image conditions is greater than or equal to a threshold. Note that the threshold is set based on the number of images to be displayed on the display unit 118 simultaneously in the related image reproduction process such that the plurality of images simultaneously displayed on the display unit 118 include no identical images. As the threshold becomes larger, the possibility that identical images are displayed when searching for and displaying images in related image reproduction lowers. This allows related image reproduction interesting and full of variety. Hence, in the related image reproduction process, a number (for example, several ten) much larger than the number of images to be displayed on the display unit 118 is set as the threshold.

Figure 7B:
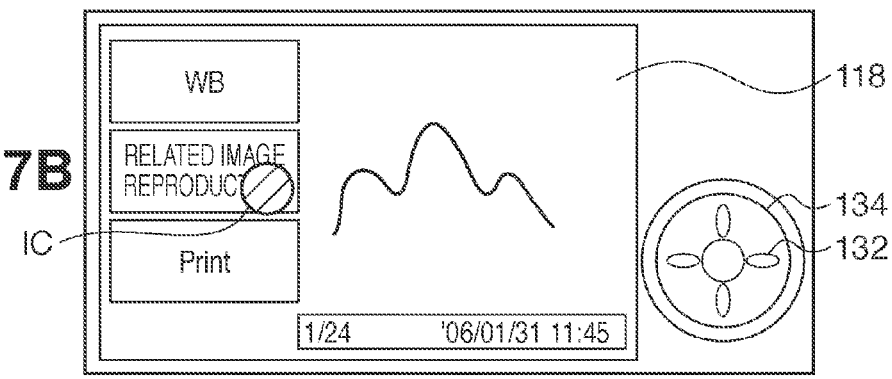

Upon determining that the number of images counted in step S608 as images satisfying the target image conditions is not greater than or equal to the threshold, the process advances to step S612, and the system control unit 124 performs a related image reproduction execution disable notification process. More specifically, as shown in FIG. 7B, an icon IC indicating that related image reproduction is unexecutable is displayed on the related image reproduction button in a superimposed manner. In step S614, the system control unit 124 disables a related image reproduction execution enable flag stored in the memory 114, and ends the related image reproduction enable/disable determination process.

Figure 7C:
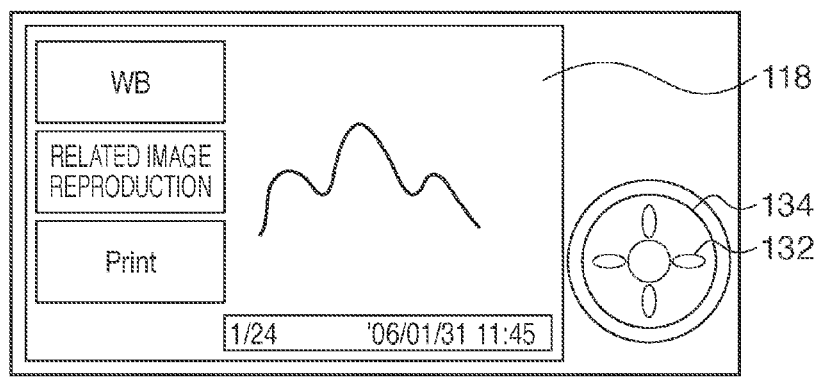

Upon determining that the number of images counted in step S608 as images satisfying the target image conditions is greater than or equal to the threshold, the process advances to step S616, and the system control unit 124 performs a related image reproduction execution enable notification process. More specifically, as shown in FIG. 7C, the related image reproduction button is displayed in an operable (selectable) state. In FIG. 7C, the form of the related image reproduction button is the same as that of the other buttons. In addition, the icon IC indicating that related image reproduction is unexecutable is not displayed so as to indicate that the operation of the related image reproduction button and execution of related image reproduction are possible. In step S618, the system control unit 124 enables the related image reproduction execution enable flag stored in the memory 114, and ends the related image reproduction enable/disable determination process.

Figure 8:
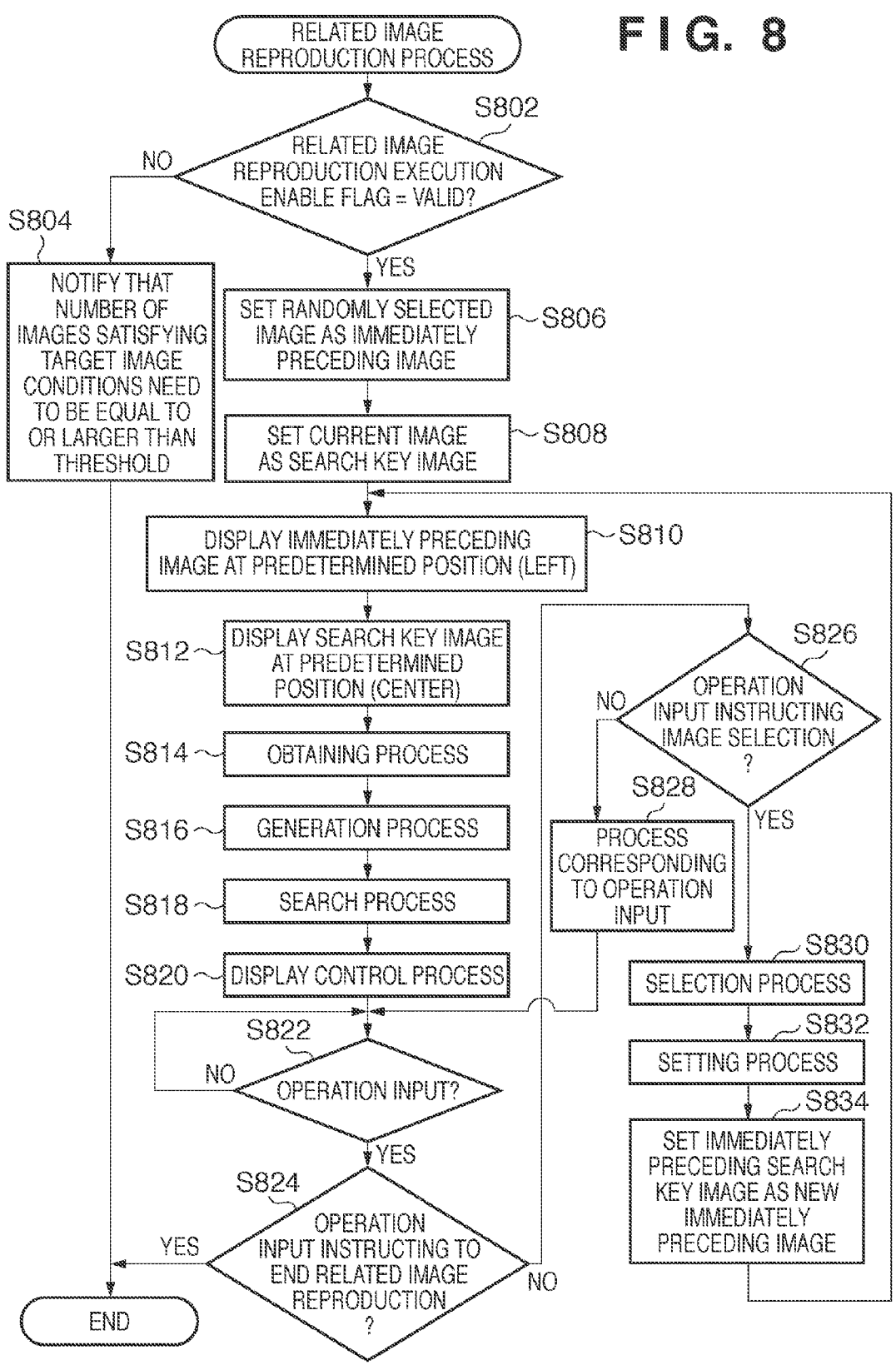
FIG. 8 is a flowchart for explaining a related image reproduction process in step S532 of FIG. 5 in detail.

The related image reproduction process in step S532 of FIG. 5 will be described. FIG. 8 is a flowchart for explaining the related image reproduction process in step S532 in detail.

Figure 7D:
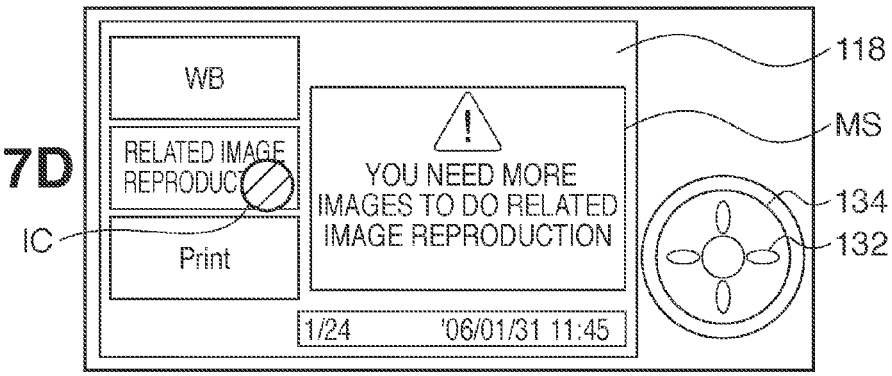

In step S802, the system control unit 124 determines whether the related image reproduction execution enable flag is valid. Upon determining that the related image reproduction execution enable flag is not valid (is invalid), the process advances to step S804, and the system control unit 124 notifies the user that the number of images satisfying the target image conditions needs to be greater than or equal to the threshold, and ends the related image reproduction process. For example, the system control unit 124 displays a message MS "You need more images for related image reproduction" on the display unit 118, as shown in FIG. 7D. If it is determined that the related image reproduction execution enable flag is valid, the process advances to step S806.

Figure 9A:
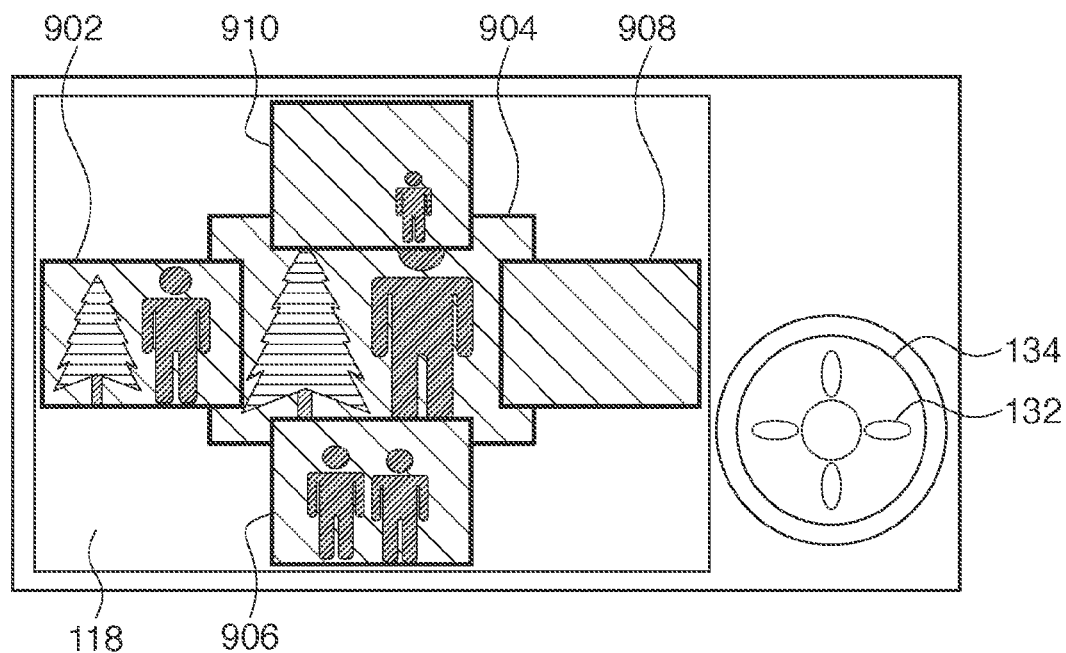
FIGS. 9A and 9B are views showing examples of display on the display unit of the image capturing apparatus shown in FIG. 1.

In step S806, the system control unit 124 randomly selects one of the plurality of images recorded in the recording medium 200 and sets it as an immediately preceding image. In step S808, the system control unit 124 sets, as the search key image, the image (current image) displayed on the display unit 118 immediately before transiting to the related image reproduction process. Note that the search key image is an image set to generate search conditions. In step S810, the system control unit 124 displays, at a predetermined position of the display unit 118, the immediately preceding image set in step S806. Similarly in step S812, the system control unit 124 displays, at a predetermined position of the display unit 118, the search key image set in step S808. In this embodiment, as shown in FIG. 9A, an immediately preceding image 902 is displayed at the left position of the display unit 118, and a search key image 904 is displayed at the central position of the display unit 118.

In step S814, the system control unit 124 performs an obtaining process of obtaining at least either of the image feature amounts and the image capturing conditions of the search key image from the search key image set in step S808. More specifically, it is possible to obtain the image feature amounts and image capturing conditions from the application marker, as described concerning the image file structure (FIG. 4). Note that the image feature amounts include, for example, color information (for example, color distribution and intensity) and face information (for example, the number of faces and their positions and sizes) of image data. The image capturing conditions include, for example, the date/time image data has been generated (captured), image capturing mode, various kinds of settings (for example, exposure setting) of the image capturing apparatus, object distance, and position information.

In step S816, the system control unit 124 performs a generation process of generating a plurality of search conditions different from each other from at least either of the feature amounts and the image capturing conditions of the search key image obtained in step S814. The search conditions equal in number to images (three in this embodiment) to be displayed on the display unit 118 as related images (that is, the images searched for using the search key image) are generated by combining information included in the image feature amounts and image capturing conditions. In this embodiment, three search conditions, that is, a search condition including both the color information and face information of the search key image, a search condition including only the color information of the search key image, and a search condition including only the face information of the search key image are generated.

In step S818, the system control unit 124 performs a search process of searching the images except the search key image set in step S808 for related images matching or similar to each of the search conditions generated in step S816. As described above, in this embodiment, the search condition including both the color information and face information of the search key image, the search condition including only the color information of the search key image, and the search condition including only the face information of the search key image are generated. Hence, images matching or similar to the color information and face information of the search key image, images matching or similar to only the color information of the search key image, and images matching or similar to only the face information of the search key image are searched for as related images. When one related image is found by executing a search process based on one of the plurality of (in this embodiment, three) search conditions, the feature amounts and/or image capturing conditions of the image are obtained. In some cases, the remaining search conditions yet to be used for the search process are adjusted based on the image feature amounts and/or image capturing conditions of the found related image, and the remaining search processes are executed using the adjusted search conditions. Assume that an image having high similarity and the same image capturing date as that of the search key image is found based on a search condition. In this case, adjustment is done such that images to be found based on the remaining search conditions include, at lower possibility, the image having high similarity and the same image capturing date as that of the search key image. When search results (related images) are obtained for all search conditions, the process advances to step S820.

Figure 9B:
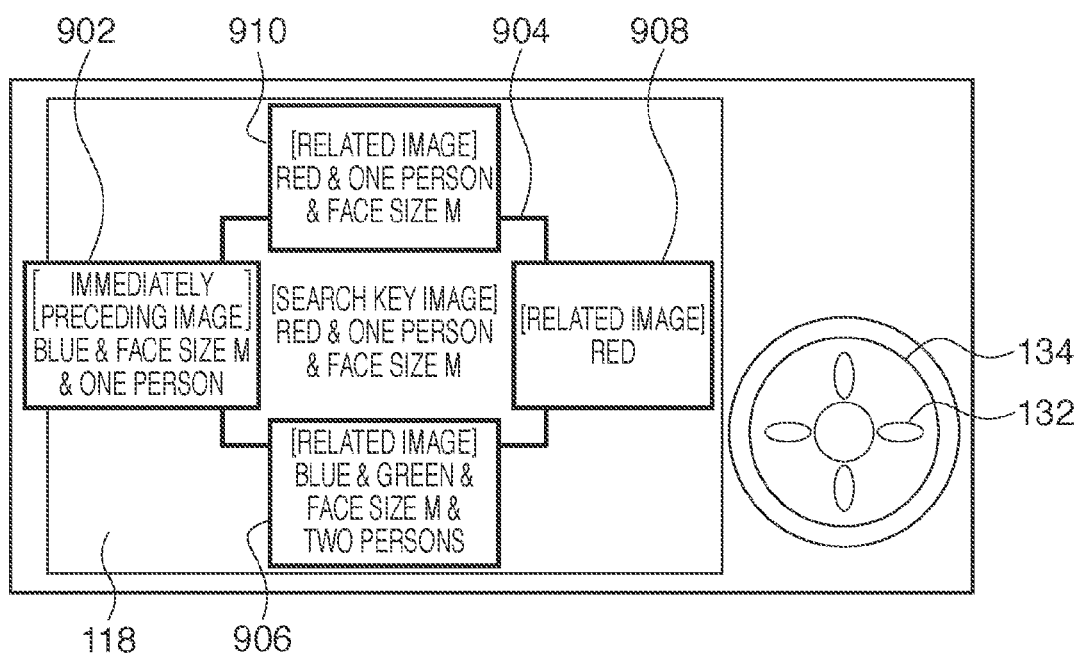

In step S820, the system control unit 124 performs a display control process of controlling to display the images found in step S818 on the display unit 118 in correspondence with each of the plurality of search conditions. More specifically, the related images found in step S818 are displayed at predetermined positions of the display unit 118 respectively assigned to the search conditions. In this embodiment, as shown in FIG. 9A, a related image 906 found based on the search condition including both the color information and face information of the search key image is displayed at the lower central position of the display unit 118. A related image 908 found based on the search condition including only the color information of the search key image is displayed at the right position of the display unit 118. A related image 910 found based on the search condition including only the face information of the search key image is displayed at the upper central position of the display unit 118. Note that FIG. 9B is a view showing the color information and face information of the immediately preceding image 902, search key image 904, and related images 906, 908, and 910. FIG. 9B does not show the information actually displayed on the display unit 118 but merely visualizes color information and face information that are image feature amounts internally used.

If a plurality of images are found based on one search condition by the search process in step S818, one of the plurality of images is randomly selected and displayed on the display unit 118. This allows to display various images for one search condition. Note that the search process in step S818 can also be performed to find one image by one search condition.

Execution of the search process (S818) may be restricted for continuous images temporally consecutively captured. For example, there is no merit for the user in repetitively displaying consecutively captured images on the display unit 118 as related images. For the consecutively captured images, the search process is performed for the representative image. This makes it possible to suppress repetitively displaying the consecutively captured images by the display control process in step S820. Note that whether images are consecutively captured images can be determined using any determination method known to those skilled in the art. For example, there are following three methods. The first method determines a set of consecutively captured images based on an identifier which represents a set of consecutively captured images and is recorded in the attribute information of each image. The second method determines, as a set of consecutively captured images, a plurality of images whose image capturing dates/times are closer within a threshold. The third method determines, as a set of consecutively captured images, a plurality of images whose image capturing dates/times are closer within a threshold and whose specific image capturing conditions which are recorded in the attribute information and do not change in the continuous shooting mode are identical.

In step S822, the system control unit 124 determines whether an operation input is received. Note that the operation input includes a user operation on the operation unit and an event for notifying the user of voltage drop of the power source unit 140. If it is determined that no operation input is received, step S822 is repeated until an operation input is received. Upon determining that an operation input is received, the process advances to step S824.

In step S824, the system control unit 124 determines whether the operation input instructs to end the related image reproduction. The operation input that instructs to end the related image reproduction is, for example, user's press (selection) of the related image reproduction end button via the operation unit. If it is determined that the operation input instructs to end the related image reproduction, the related image reproduction process ends. Upon determining that the operation input does not instruct to end the related image reproduction, the process advances to step S826.

In step S826, the system control unit 124 determines whether the operation input instructs image selection. Image selection means that the user selects one image from the immediately preceding image and related images displayed on the display unit 118 in steps S810 and S820. More specifically, the user designates one of the left, down, up, and right buttons of the 4-way selector 132 having the same positioned relationship as that of the immediately preceding image 902 and the related images 906, 908, and 910 in FIG. 9A, thereby selecting an image. Alternatively, since the display unit 118 has a touch panel, the user can also select an image by touching one of the immediately preceding image 902 and the related images 906, 908, and 910 displayed on the display unit 118. Upon determining that the operation input does not instruct image selection, the process advances to step S828, and the system control unit 124 performs a process corresponding to the operation input. Note that there are, for example, following four processes as the process to be performed in step S828 in correspondence with the operation input. The first process enlarges the search key image displayed at the center of the display unit 118 and displays it when the operation input determined in step S822 instructs to enlarge the search key image. The operation input of enlarging the search key image is preferably performed using a zoom lever that is one member of the operation unit. The zoom lever is an operation member to be used to instruct optical zooming or electronic zooming in the image capturing mode or enlargement or reduction of an image reproduced in the reproduction mode. The second process displays the menu screen on the display unit 118 and accepts various setting operations when the operation input determined in step S822 instructs to press the menu button. The third process performs a process corresponding to an instruction for the search key image when the operation input determined in step S822 instructs a rotation process (for example, rotation, trimming, or resize) of the search key image. The fourth process changes the attribute of the search key image in accordance with an instruction when the operation input determined in step S822 instructs to add/delete attribute information to/from the search key image. Note that the attribute information includes, for example, rating, keyword, classification information, protect attribute, and print designation attribute. On the other hand, if it is determined that the operation input instructs image selection, the process advances to step S830.

In step S830, the system control unit 124 performs a selection process of selecting, in accordance with a user operation, one of the plurality of images (immediately preceding image and related images) displayed on the display unit 118.

In step S832, the system control unit 124 performs a setting process of setting the image selected in step S830 as a new search key image. In step S834, the system control unit 124 sets the immediately preceding search key image (that is, the search key image before setting the new search key image in step S832) as a new immediately preceding image. When the new search key image and the new immediately preceding image are set in steps S832 and S834, the process returns to step S810. The obtaining process (S814), generation process (S816), search process (S818), display control process (S820), selection process (S830), and setting process (S832) are repetitively performed using the new search key image.

According to the image capturing apparatus 100 of this embodiment, it is possible to continuously (repetitively) perform the image search by setting, as a new search key image, one related image selected in accordance with the user operation from the plurality of related images found using the search key image. At this time, the user need not input keywords or search conditions. Only selecting an image based on interest allows to search for and display images corresponding to the interest. Hence, the image capturing apparatus 100 can improve the image search efficiency and operability (usability), as compared to the prior arts.

When repetitively performing the image search, the image capturing apparatus 100 can perform a search more greatly reflecting user's interest by storing the search condition of an image selected in the selection process and preferentially generating the search condition in the generation process of the next search.

For example, assume that the feature amount and the image capturing condition of the search key image are "color=red" and "number of persons=group photo", and a related image found by "search condition=group photo" is selected by the user. In this case, before the next search using the related image as the search key image, "search condition=group photo" is preferentially generated as a search condition, thereby meeting the interest of the user who wants to browse group photos.

The image capturing apparatus 100 can also generate search conditions of different strictness levels to search for and display various images in the related image reproduction process. More specifically, the apparatus generates first, second, and third search conditions to search for images of different levels of matching or similarity to the search key image. For example, the first search condition includes at least either of the feature amounts and the image capturing conditions of the search key image in the largest number (first number) to set the highest level (first level) of matching or similarity to the search key image. The second search condition includes at least either of the feature amounts and the image capturing conditions of the search key image in the second number smaller than the first number to set the second level lower than the first level of matching or similarity to the search key image. The third search condition includes at least either of the feature amounts and the image capturing conditions of the search key image in the third number smaller than the second number to set the third level lower than the second level of matching or similarity to the search key image.

In this embodiment, the plurality of images (immediately preceding image, search key image, and related images) displayed on the display unit 118 have the same positioned relationship as that of the 4-way selector 132, thereby increasing the user operability in selecting a related image. At this time, it is possible to always lay out images found by the plurality of search conditions in the same positioned relationship on the display unit 118. Especially in image feed, since the forward button is often assigned to the right button of the 4-way selector 132, and the back button to the left button, the user tends to press (select) the right button many times when browsing images. Hence, an image found by the above-described first search condition is always displayed at the right position of the display unit 118 corresponding to the right button of the 4-way selector 132. In this case, the user can continue to browse images similar to the first search key image by repetitively pressing the right button as in normal image feed because the search condition varies less. On the other hand, always displaying an image found by the above-described first search condition at the right position of the display unit 118 corresponding to the right button of the 4-way selector 132 may be prohibited. This allows the user to browse various images by repetitively pressing the right button as in normal image feed because the search condition varies largely.

Note that the related image reproduction enable/disable determination process described with reference to FIG. 6 may be performed every time the operation mode transits to the still image capturing mode and/or moving image capturing mode and every time a still or moving image is captured in the still image capturing mode and/or moving image capturing mode, and an image file is generated. In the still image capturing mode and/or moving image capturing mode, display may be done to enable to identify, depending on the related image reproduction execution enable flag, whether related image reproduction is possible, and if impossible, how many images are necessary. This allows the user to know at the time of image capturing whether related image reproduction is possible in the present situation, and if impossible, how many images need to be captured to enable related image reproduction, and thus helps in determining whether to capture more images.

In this embodiment, an example in which the present invention is applied to a digital camera has been described. However, the present invention is not limited to this. For example, the present invention is applicable to an apparatus having a display device controllable to display a plurality of images simultaneously, such as a personal computer, PDA, cellular phone terminal, portable image viewer, or printer.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent application No. 2010-024830 filed on Feb. 5, 2010, which is hereby incorporated by reference herein in its entirety.

What is claimed is:

1. An image search apparatus for searching for an image, comprising:
an obtaining unit configured to perform an obtaining process of obtaining, from a search key image set out of a plurality of images to generate a search condition, at least either of feature amounts of the search key image and image capturing conditions of the search key image;
a generation unit configured to perform a generation process of generating a plurality of search conditions different from each other from the at least either of the feature amounts and the image capturing conditions obtained by said obtaining unit;
a search unit configured to perform a search process of searching the plurality of images except the search key image for an image matching or similar to the search condition for each of the plurality of search conditions generated by said generation unit;
a display control unit configured to perform a display control process of controlling a display unit to display a plurality of images that are images found for the plurality of search conditions by said search unit;
a selection unit configured to perform a selection process of selecting, in accordance with a user operation, one image from the plurality of images displayed on the display unit by said display control unit;
a setting unit configured to perform a setting process of setting, as a new search key image, the image selected by said selection unit; and
a control unit configured to, when said setting unit sets the new search key image, control said obtaining unit, said generation unit, said search unit, said display control unit, said selection unit, and said setting unit to perform the obtaining process, the generation process, the search process, the display control process, the selection process, the display control process, the selection process, and the setting process using the new search key image.

2. The apparatus according to claim 1, further comprising an operation unit including a plurality of buttons to accept the user operation,
wherein said display control unit controls display of the images on the display unit so as to display the plurality of images on the display unit in the same positioned relationship as that of the plurality of buttons.

3. The apparatus according to claim 1, wherein said generation unit generates, as the plurality of search conditions, a first search condition to be used to search for an image whose level of matching or similarity to the search key image is a first level, a second search condition to be used to search for an image whose level is a second level lower than the first level, and a third search condition to be used to search for an image whose level is a third level lower than the second level.

4. The apparatus according to claim 3, wherein
the first search condition includes the at least either of the feature amounts and the image capturing conditions in a first number,
the second search condition includes the at least either of the feature amounts and the image capturing conditions in a second number smaller than the first number, and
the third search condition includes the at least either of the feature amounts and the image capturing conditions in a third number smaller than the second number.

5. The apparatus according to claim 3, wherein said display control unit controls display of the images on the display unit so as to always display an image matching or similar to the first search condition, an image matching or similar to the second search condition, and an image matching or similar to the third search condition, which are found by said search unit, in the same positioned relationship on the display unit.

6. The apparatus according to claim 1, wherein said display control unit controls to display the search key image on the display unit together with the images found by said search unit.

7. The apparatus according to claim 1, wherein said display control unit controls to display the new search key image and an immediately preceding search key image on the display unit together with images found using search conditions generated from the new search key image set by said setting unit.

8. The apparatus according to claim 1, wherein for, out of the plurality of images, continuously shot images temporally consecutively captured, said search unit performs the search process for a representative image.

9. The apparatus according to claim 1, wherein said search unit adjusts, based on information obtained from an image found by one search condition out of the plurality of search conditions, the remaining search conditions and performs the search using the adjusted remaining search conditions.

10. The apparatus according to claim 9, wherein when the image found by the one search condition is an image having high similarity and the same image capturing date as that of the search key image, the remaining search conditions are adjusted such that images to be found based on the adjusted remaining search conditions include, at lower possibility, the image having high similarity and the same image capturing date as that of the search key image.

11. The apparatus according to claim 1, further comprising:
a switching unit configured to switch to an operation mode in which the obtaining process, the generation process, the search process, the display control process, the selection process, and the setting process are performed;
a determination unit configured to determine whether images capable of serving as the search key image are recorded in a recording medium in a number not less than a threshold; and
a switching control unit configured to control said switching unit to switch to the operation mode when said determination unit determines that the images capable of serving as the search key image are recorded in the recording medium in the number not less than the threshold, and control said switching unit not to switch to the operation mode when said determination unit determines that the images capable of serving as the search key image are not recorded in the recording medium in the number not less than the threshold.

12. The apparatus according to claim 11, wherein when said determination unit determines that the images capable of serving as the search key image are not recorded in the recording medium in the number not less than the threshold, said display control unit controls to display, on the display unit, an indication allowing to identify that switching to the operation mode is impossible.

13. The apparatus according to claim 12, further comprising an image capturing unit,
wherein said display control unit controls to display the indication allowing to identify in an image capturing mode to perform image capturing by said image capturing unit.

14. The apparatus according to claim 11, wherein said determination unit performs the determination by setting an image having specific attribute information as the image capable of serving as the search key image.

15. The apparatus according to claim 11, wherein the threshold is set based on the number of images to be displayed on the display unit in the operation mode such that the images to be simultaneously displayed on the display unit as the plurality of found images include no identical images.

16. The apparatus according to claim 11, wherein said determination unit performs the determination by regarding a set of continuously shot images temporally consecutively captured, as one image capable of serving as the search key image.

17. The apparatus according to claim 11, wherein said determination unit performs the determination by regarding an image before an edit process and an image after the edit process as one image capable of serving as the search key image.

18. A method of controlling an image search apparatus for searching for an image, comprising the steps of:
obtaining, from a search key image set out of a plurality of images to generate a search condition, at least either of feature amounts of the search key image and image capturing conditions of the search key image;
generating a plurality of search conditions different from each other from the at least either of the feature amounts and the image capturing conditions obtained in the obtaining;
searching the plurality of images except the search key image for an image matching or similar to the search condition for each of the plurality of search conditions generated in the generating;
controlling a display unit to display a plurality of images that are images found for the plurality of search conditions in the searching;
selecting, in accordance with a user operation, one image from the plurality of images displayed on the display unit;

setting, as a new search key image, the image selected in the selecting; and when the new search key image is set in the setting, controlling to perform the obtaining, the generating, the searching, the controlling the display unit, the selecting, and the setting using the new search key image.

19. A non-transitory computer-readable storage medium recording a program which causes a computer to execute a method of controlling an image search apparatus for searching for an image, the program causing the computer to execute the steps of:

obtaining, from a search key image set out of a plurality of images to generate a search condition, at least either of feature amounts of the search key image and image capturing conditions of the search key image;

generating a plurality of search conditions different from each other from the at least either of the feature amounts and the image capturing conditions obtained in the obtaining;

searching the plurality of images except the search key image for an image matching or similar to the search condition for each of the plurality of search conditions generated in the generating;

controlling a display unit to display a plurality of images that are images found for the plurality of search conditions in the searching;

selecting, in accordance with a user operation, one image from the plurality of images displayed on the display unit;

setting, as a new search key image, the image selected in the selecting; and when the new search key image is set in the setting, controlling to perform the obtaining, the generating, the searching, the controlling the display unit, the selecting, and the setting using the new search key image.

* * * * *